United States Patent [19]

Sigiyama et al.

[11] Patent Number: 4,516,161
[45] Date of Patent: May 7, 1985

[54] SYSTEM FOR PAUSING REPRODUCTION IN ROTARY RECORDING MEDIUM REPRODUCING APPARATUS

[75] Inventors: Hiroyuki Sigiyama, Isehara; Masaki Sakurai; Ryozo Abè, both of Yokohama; Kenji Yoshihara, Chiba, all of Japan

[73] Assignee: Victor Company of Japan, Ltd., Yokohama, Japan

[21] Appl. No.: 401,231

[22] Filed: Jul. 23, 1982

[30] Foreign Application Priority Data

Jul. 28, 1981 [JP] Japan .......................... 56-111837[U]

[51] Int. Cl.³ .............................................. H04N 5/781
[52] U.S. Cl. .................................... 358/342; 358/907
[58] Field of Search .............. 358/312, 313, 335, 342, 358/907; 360/10.1, 27, 13, 31, 137; 369/47

[56] References Cited

U.S. PATENT DOCUMENTS 4,340,907 7/1982 Hirata et al. ..................... 369/47 X

FOREIGN PATENT DOCUMENTS

| 3039260 | 5/1981 | Fed. Rep. of Germany . |
| 1285475 | 8/1972 | United Kingdom . |
| 1519974 | 8/1978 | United Kingdom . |
| 2018491A | 10/1979 | United Kingdom . |
| 1563680 | 3/1980 | United Kingdom . |
| 2082823A | 3/1982 | United Kingdom . |
| 2086083A | 5/1982 | United Kingdom . |
| 2103864A | 2/1983 | United Kingdom . |

Primary Examiner—Robert L. Richardson
Attorney, Agent, or Firm—Louis Bernat

[57] ABSTRACT

A pausing system pauses reproduction in a rotary recording medium reproducing apparatus which reproduces a rotary recording medium recorded with an information signal on a spiral track. The reproducing apparatus comprises a reproducing transducer having a reproducing element for reproducing a signal from a track on the rotary recording medium and a kicking mechanism for kicking the reproducing element to an adjacent track in response to a kick pulse applied thereto. The pausing system comprises a pause mode signal supplying circuit for supplying a pause signal when the reproducing apparatus is to be put into a pause mode, where the reproducing apparatus generates the kick pulse in response to the pause mode signal supplied thereto so that the reproducing element scans over the same track to carry out a pause operation, a timer operating in response to the pause mode signal supplied from the pause mode signal supplying circuit, for producing an output signal after a predetermined time period has elapsed, and a mode control circuit supplied with the output signal of the timer, for cancelling the scanning of the same track by the reproducing element.

4 Claims, 6 Drawing Figures 4,516,161

SYSTEM FOR PAUSING REPRODUCTION IN ROTARY RECORDING MEDIUM REPRODUCING APPARATUS

BACKGROUND OF THE INVENTION

The present invention generally relates to systems for pausing reproduction in rotary recording medium reproducing apparatuses, and more particularly to a system for pausing reproduction in a rotary recording medium reproducing apparatus, which advances the operational mode of the reproducing apparatus to a preset mode if reproduction is paused to temporarily discontinue reproduction in the midst of reproduction and the duration of the pause or pausing time is longer than a predetermined time period.

An information signal recording and reproducing system has been previously proposed and realized, in which the recording system forms pits in accordance with the information signal to record the information signal along a spiral track on a flat rotary recording medium (hereinafter simply referred to as a disc), without forming a groove therein. In the reproducing system, a reproducing stylus traces over along this track to reproduce the recorded information signal in response to variations in the electrostatic capacitance formed between a reproducing stylus and the disc.

In this previously proposed system, since no grooves are provided on the disc for guiding the reproducing stylus, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By use of this previously proposed system, there is no possibility whatsoever of the reproducing stylus or the disc being damaged, since the recording track has no groove. The reproducing stylus can trace the same portion of the track repeatedly many times, whereby a special reproduction such as still, slow-motion, or quick-motion picture reproduction becomes possible.

However, there are cases where it is necessary to temporarily discontinue reproduction when normal reproduction is being performed with respect to the disc, such as a case where the operator must answer a telephone call. That is, if the normal reproduction advances while the operator is having a telephone conversation in the above example, the operator will miss the picture reproduced during the telephone conversation. Moreover, the reproduced sound will interfere with the telephone conversation. Accordingly, in such a case, it is desirable to discontinue reproduction at the point when the operator answers the telephone call and resume reproduction from that point when the telephone conversation is finished.

In order to satisfy this demand, a system was proposed in which the reproducing apparatus can be put into a still picture reproduction mode by manipulating a pause button for temporarily discontinuing reproduction. By this manipulation of the pause button, a position on the reproducing track is maintained because the reproducing stylus scans over the same track. In this proposed system, the operational mode of the reproducing apparatus is returned to the normal reproduction mode from the still picture reproduction mode, by cancelling the manipulated pause button. However, in reality, the telephone conversation may be long, and the operator may forget to cancel the pausing state after the telephone conversation is finished.

In the above case where the pausing state is maintained for a long time period, the reproducing stylus will only scan and slide over the same track for this long time period. As a result, a groove will be formed on the flat recording surface of the disc due to friction, by the repetitive scanning of the same track.

Hence, in order to overcome the above deficiency, a system was tested in which the reproducing stylus is raised up to discontinue the contact between the disc during the above pause mode wherein the reproduction is discontinued. Because there is no contact between the disc and the reproducing stylus in this system even when the pausing time is long, a groove is prevented from being formed in the disc due to the repetitive scanning of the same track.

However, when an elevating mechanism for raising and lowering the reproducing stylus is used, the reproducing apparatus is inevitably affected by the mechanical error inherent to this elevating mechanism. For example, if the reproducing stylus is raised and then lowered, the lowered position is deviated by approximately 1 mm, for example, from the position before the reproducing stylus was raised. In this case, because the track pitch is 1.35 mm, deviation in the order of 740 tracks or 50 seconds in time (reproducing time of one track is 1/15 second) is introduced. Hence, after the pausing state is cancelled, reproduction will be resumed from a position 50 seconds before or after the position before the pause operation was effected. Thus, there is a disadvantage in that reproduced picture cannot be monitored in a continuous manner from the position before the pause operation was effected.

SUMMARY OF THE INVENTION

Accordingly, it is a general object of the present invention to provide a novel and useful system for pausing reproduction in rotary recording medium reproducing apparatus, in which the above described disadvantages have been overcome.

Another and more specific object of the present invention is to provide a system for pausing reproduction in rotary recording medium reproducing apparatus, in which the operational mode of the reproducing apparatus is automatically changed to a predetermined mode after a pause mode is continued for a predetermined time period of an order such that a rotary recording medium will not be damaged due to the repetitive scanning of the same track by a reproducing stylus. According to the system of the present invention, the rotary recording medium is prevented from being damaged even if the operator forgets to cancel the pause mode. In addition, if the pause mode is cancelled within the above predetermined time period, it is possible to continuously monitor the reproduced picture from a position before the pause mode was effected.

Other objects and further features of the present invention will be apparent from the following detailed description when read in conjunction with the accompanying drawings.

DETAILED DESCRIPTION

Figure 1:
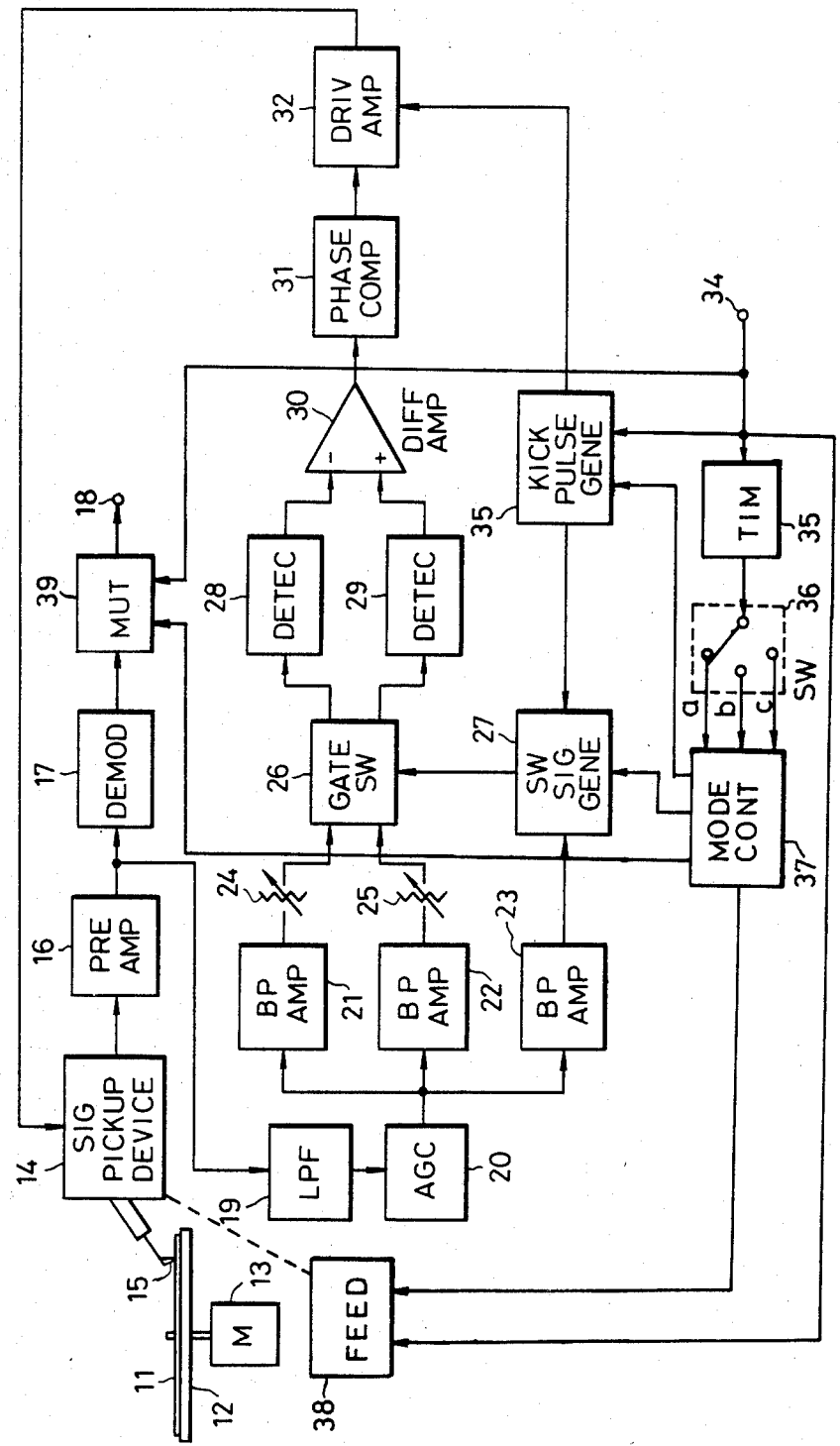
FIG. 1 is a systematic block diagram showing an embodiment of a system for pausing reproduction in rotary recording medium reproducing apparatus according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and is moved and fed continuously and linearly in a direction from the outer peripheral part to the inner peripheral part at a speed equal to the distance of one track pitch per revolution of the turntable 12 by a feeding device 38, during a forward normal reproduction mode. Accordingly, the stylus 15 of the signal pickup device 14 travels radially across the rotating disc 11 and relatively traces the spiral track of the disc 11.

Figure 2:
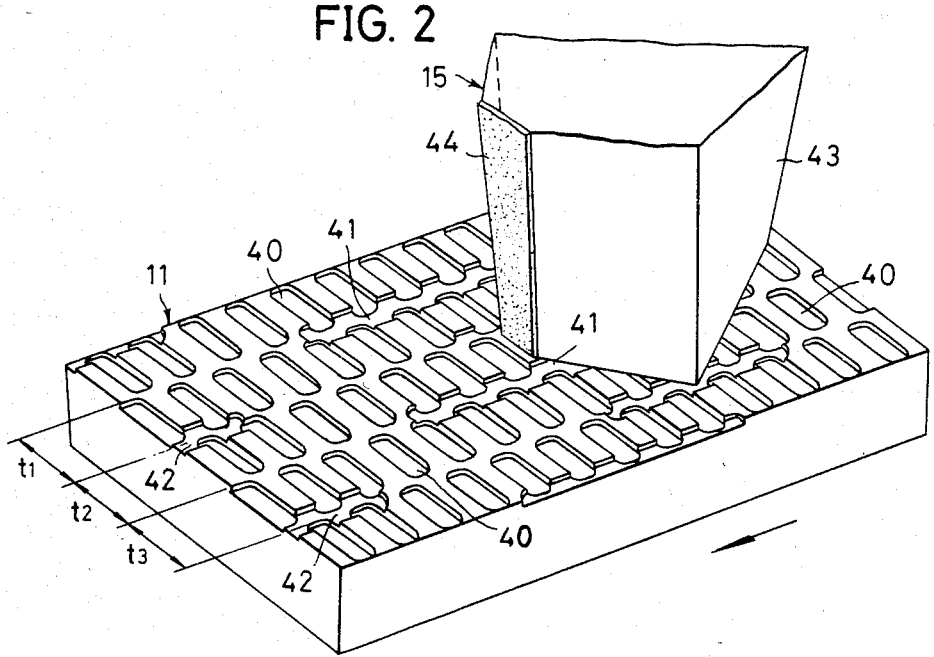
FIG. 2 is a perspective view, in an enlarged scale, showing a part of a disc together with a tip end part of a reproducing stylus.

A main information signal comprising a video signal and an audio signal is recorded on a spiral track with pits formed on the disc 11 according to the information contents of the signal One part of this track is shown in an enlarged scale in FIG. 2. In FIG. 2, track turns of a single continuous spiral track, corresponding to each revolution of the disc 11, are designated by t1, t2, t3, .. .. Each track turn is constituted by the formation of pits 40 of a main information signal along a plane track path and has no stylus guide groove formed therein With respect to one track turn t1, in every horizontal scanning period (1H) at a position corresponding to the horizontal blanking period, pits 41 of a first reference signal fp1 are formed on one lateral side of the track as viewed in the track path direction. Pits 42 of a second reference signal fp2 are formed on the other side of the track.

At an intermediate position between the centerlines of adjacent track turns, only pits of either one kind of the pits 41 and 42 of the above reference signals fp1 and fp2 are formed, and moreover, with respect to one track, the sides on which the pits 41 and 42 are formed are alternated for every track turn. That is, if the pits 41 and 42 are respectively formed on the right and left sides of one track turn, for example, the pits 42 and 41 will respectively be formed on the right and left sides of each of the adjacent track turns.

The tip end of the reproducing stylus 15 has a shape shown in FIG. 2. The reproducing stylus 15 is constituted by a stylus structure 43 having a disc tracing surface which has a width greater than a track width, and an electrode 44 fixed to the rear face of the stylus structure 43. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 44 of the reproducing stylus 15.

Figure 3:
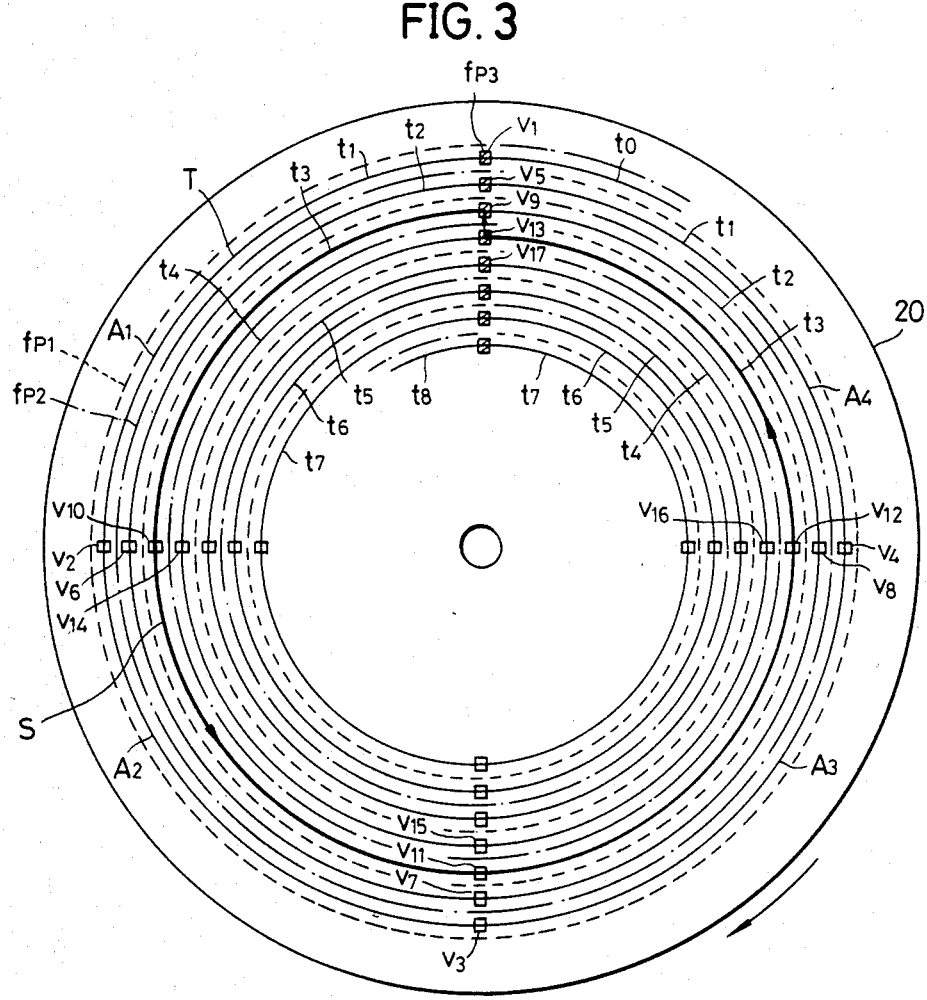
FIG. 3 shows a track pattern on a disc.

On the disc 11, as indicated in FIG. 3, the main information signal is recorded along a spiral track T for four fields, for one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, . . . , and the successive track parts corresponding to one revolution of the disc of a single spiral track T is designated by track turns t1, t2, t3, . . . . Furthermore, a third reference signal fp3 is recorded at the starting end positions V1, V5, V9, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original main information signal by a demodulator 17 and is obtained as an output from an output terminal 18 through a muting circuit 39.

The output signal of the preamplifier 16 is supplied to a lowpass filter 19 wherein the reference signals fp1, fp2, and fp3 are separated. The output reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26. The reference signal fp3 separated and amplified at this bandpass amplifier 23, is supplied to a switching signal generator 27. The gate switching circuit 26 performs switching of the reference signals fp1 and fp2 every one revolution period of the disc 11 upon normal reproduction, in response to the switching signal generated by the switching signal generator 27 which is applied thereto. Hence, due to the switching signal which reverses polarity every two frames (1/15 seconds), the signals fp1 and fp2 are always alternately supplied to detecting circuits 28 and 29 from the gate switching circuit 26.

The detecting circuits 28 and 29 detect the envelopes of their respective input reference signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal passes through a phase compensation circuit 31 and is further amplified to a specific level by a driving amplifier 32.

An output of the driving amplifier 32 is applied to tracking coils of the signal pickup device 14 as a control signal, to control the signal pickup device 14. As a result, tracking control is carried out so that the above tracking error signal becomes zero, that is, so that the reproducing stylus 15 correctly scans over the track T on the disc 11.

Next, the operator pushes a pause button (not shown) in such a case where the operator must answer a telephone call during normal reproduction or a case where the operator must temporarily discontinue the normal reproduction to do something else. When the pause button is pushed, a pause signal is applied to a terminal 34. This pause signal is supplied to a kick pulse generator 33, a timer 35, the feeding device 38, and the muting circuit 39.

The feeding device 38 stops the feeding of the signal pickup device 14, in response to the above pause signal applied thereto. Hence, the signal pickup device 14 is stopped from being fed at that position. When the pause signal is applied to the kick pulse generator 33, the kick pulse generator 33 generates a kick pulse at a rate of once per revolution of the disc 11, as the reproducing stylus 15 reaches the position (V1, V5, V9, ... ) where the third reference signal fp3 is recorded. This kick pulse thus generated, is supplied to the switching signal generator 27, to reverse the polarity of the switching signal. On the other hand, the kick pulse is also supplied to the tracking coils of the signal pickup device 14 through the driving amplifier 32, and the reproducing stylus 15 is accordingly shifted to a track in the outer peripheral direction of the disc 11. Hence, as indicated by a bold solid line S in FIG. 3, the reproducing stylus 15 is shifted in the outer peripheral direction of the disc 11 by one track pitch when the reproducing stylus reaches the position V13 after scanning over the track turn t3, and then again scans over the track turn t3 from the beginning thereof. Thereafter, the above operation is repeated. Accordingly, the reproducing stylus 15 repetitively scans and reproduces only the track turn t3.

When the above pause signal is applied to the muting circuit 39, the muting circuit 39 mutes the incoming input signal and does not produce an output signal from the terminal 18. Therefore, during the pause mode, the reproduction of the video signal (picture) and the audio signal are discontinued at the receiver.

The timer 35 starts a timer operation in response to the pause signal applied thereto. This timer 35 is constructed to produce an output pulse after three minutes elapses, for example, from the time when the pause signal is applied thereto. A mode setting switch 36 is connected to the timer 35. The connection of the switch 36 is manually switched so as to make contact with any one of contacts a, b, and c, according to whether the mode after the pause mode is to be a normal reproduction mode, frame advance reduction mode, or double-speed reproduction mode.

A mode control circuit 37 sets the reproduction mode of the reproducing apparatus to the normal reproduction mode, frame advance reproduction mode, or double-speed reproduction mode, according to whether a signal is obtained from the contact a, b, or c of the switch 36.

For example, the connection of the switch 36 is preset to be connected to the contact a. In this case, when the pause signal is obtained from the terminal 34 by pushing the pause button, the feeding of the signal pickup device 14 is stopped as described above. Hence, the reproducing stylus 15 thereafter repetitively scans over the track which was being reproduced when the pause button was pushed. At this point, the reproduced signals are muted by the muting circuit 39.

The timer 35 produces an output signal after three minutes has elapsed from the time when the pause signal is applied thereto. This output signal of the timer 35 is applied to a normal reproduction mode terminal of the mode control circuit 37, through the contact a. Thus, the mode control circuit 37 supplies a signal to the kick pulse generator 33 to stop the generation of the kick pulse. The mode control circuit 37 also supplies a signal to the muting circuit 39 to stop the muting operation and pass the incoming input signal to the muting circuit 39. In addition, the mode control circuit 37 supplies a signal to the feeding device 38 to resume the operation to feed the signal pickup device.

Accordingly, the reproducing apparatus is in the pause mode for three minutes after the pause button is pushed. After this three minute time period is elapsed, the reproducing apparatus is put into the normal reproduction mode. That is, the reproducing stylus 15 successively scans over the track turns beyond the track turn t3, to carry out the normal reproduction. Thus, even if the operator forgets to cancel the pause button after the pause button is pushed or if the pause button cannot be cancelled for some reason, the reproducing stylus 15 advances to a track turn beyond the track turn t3 after the three minute time period has elapsed. Hence, a groove is prevented from being formed in the recording surface of the disc due to the repetitive reproduction of the same track turn t3 by the reproducing stylus 15.

When the above pause button is cancelled before the three minute time period elapses, no pause signal will be obtained from the terminal 34, and the normal reproduction will be continued.

The time set in the timer 35 is not limited to the above three minutes. However, it is desirable for this set time period to be a long time period without introducing damage to the disc. Thus, three minutes is an embodiment of a desirable set time period.

If the switch 36 is connected to the contact b or c, the mode control circuit 37 supplies a signal for causing frame advance reproduction or double-speed reproduction, to the kick pulse generator 33, the switching signal generator 27, and the feeding device 38.

Figure 4:
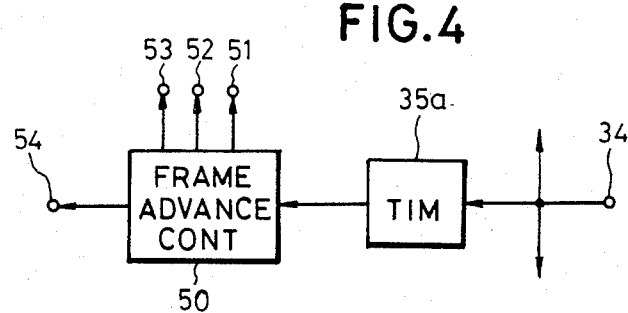
FIGS. 4, 5, and 6 are systematic block diagrams respectively showing second, third, and fourth embodiments of a system for pausing reproduction according to the present invention.

Next, description will be given with respect to an essential part of a second embodiment of a system according to the present invention, by referring to FIG. 4. In FIG. 4, a timer 35a operates while the pause signal from the terminal 34 is continuously applied thereto, and produces an output pulse signal every time the three minute time period elapses. A frame advance control circuit 50 applies a kick pulse stopping signal to the kick pulse generator 33 from a terminal 51, every time the output pulse signal from the timer 35a is applied thereto. Hence, the kick pulse generator 33 stops the generation of the kick pulse once every time the output pulse signal of the timer 35a is applied to the frame advance control circuit 50. During other periods, the kick pulse generator 33 generates the kick pulse once for every revolution of the disc 11. Accordingly, while the timer 35a is operating, the kick pulse is not generated at a rate of once for every three minutes. During the period in which the kick pulse is not generated, the reproducing stylus 15 advances by one track turn, and scans over the same track turn for the succeeding three minutes.

In FIG. 4, an output terminal 52 of the frame advance control circuit 50 is connected to the switching signal generator 27. Moreover, terminals 53 and 54 are respectively connected to the muting circuit 39 and the feeding device 38.

Therefore, the reproducing stylus 15 advances by one track turn for every three minutes, to carry out the frame advance reproduction. As a result, the duration the reproducing stylus 15 scans over each track is three minutes, and the recording surface of the disc 11 is prevented from being damaged. Furthermore, even if the duration of the pause mode is long, the reproducing stylus 15 is at a position only slightly advanced from the position where the pause mode was effected after this long period of time when the pause mode is cancelled. For example, even if the pause mode is maintained for 15 minutes, the reproducing stylus 15 is only advanced by five tracks (⅓ second in reproducing time). Therefore, it is possible to obtain a reproduced picture substantially continuous with the reproduced picture obtained upon starting of the pause mode, after the pause mode is released.

Figure 5:
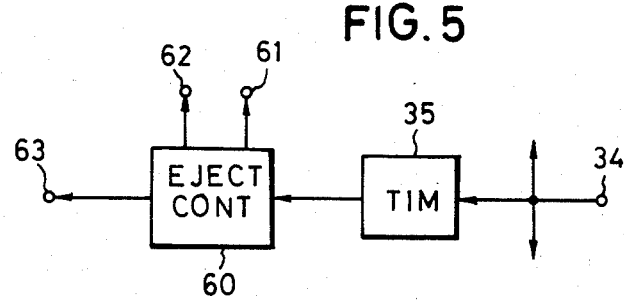

Next, description will be given with respect to an essential part of a third embodiment of the system according to the present invention, by referring to FIG. 5. In FIG. 5, an eject control circuit 60 produces a signal for raising the reproducing stylus 15 of the signal pickup device 14, from a terminal 61, when applied with the output pulse signal of the timer 35. In addition, the eject control circuit 60 produces a signal for stopping the rotation of the motor 13 which rotates the turntable, from a terminal 62. Furthermore, the eject control circuit 60 also produces a signal for returning the signal pickup device 14 to a resting position other than above the disc 11 by the feeding device 38, from a terminal 63.

Accordingly, if the reproducing apparatus is put into the pause mode, the eject control circuit 60 raises the reproducing stylus 15 after a predetermined set time period in the timer 35 is elapsed. Thus, the signal pickup device 14 is returned to the resting position, and the signal pickup device 14 is ejected. Therefore, even if the operator forgets to cancel the pause mode, the reproducing stylus 15 does not unnecessarily continue making sliding contact with the disc 11, and unnecessary power consumption is eliminated because the motor 13 is prevented from continuously rotating unnecessarily.

Figure 6:
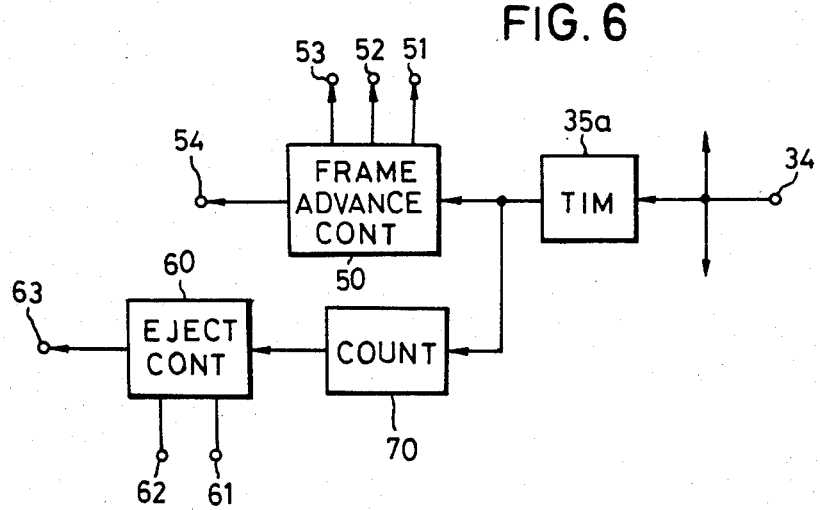

Next, description will be given with respect to an essential part of a fourth embodiment of the system according to the present invention, by referring to FIG. 6. In FIG. 6, those parts which are the same as those corresponding parts in FIGS. 4 and 5 are designated by the same reference numerals, and their description will be omitted.

In FIG. 6, as in the second embodiment described in conjunction with FIG. 4, the timer 35a produces the pulse signal every time the three minute time period elapses, while the pause signal is supplied thereto from the terminal 34. Every time this pulse signal is produced from the timer 35a, the reproducing stylus 15 is advanced by one track turn by the frame advance control circuit 50, and the frame advance reproduction is accordingly carried out. On the other hand, a counter 70 counts the output pulse signal of the timer 35a. For example, when the counter 70 counts ten output pulse signals of the timer 35a, the counter 70 supplies an output signal to the eject control circuit 60, to eject the reproducing stylus 15.

According to this fourth embodiment of the present invention, even if the telephone conversation becomes long in the above described example, the frame advance operation in which the reproducing stylus is advanced by one track turn for every three minute period is continued for thirty minutes. Hence, when the pause mode is cancelled after a time period of nearly thirty minutes have elapsed, the reproducing stylus 15 is only advanced by ten track turns, that is, about ⅔ second in reproducing time. Thus, it is possible to obtain a reproduced picture substantially continuous with the reproduced picture obtained upon starting of the pause mode. Moreover, if the reproducing apparatus is left neglected for over thirty minutes after the reproducing apparatus is put into the pause mode, for example, it is discriminated that the operator has forgotten to cancel the pause mode or the pause mode could not be cancelled for some reason, and the signal pickup device 14 is ejected and returned to the resting position after the above thirty minutes have elapsed. Therefore, the reproducing stylus is prevented from unnecessarily making continuous sliding contact with the disc for a long time period, and the turntable is prevented from continuously rotating unnecessarily.

Further, the present invention is not limited to these embodiments, but various variations and modifications may be made without departing from the scope of the present invention.

What is claimed is:

1. A system in a rotary recording medium reproducing apparatus for pausing reproduction of a rotary recording medium having an information signal recorded on a spiral track, said reproducing apparatus comprising a reproducing transducer having a reproducing element for reproducing a signal from the track on said rotary reproducing medium and kicking means for kicking said reproducing element to an adjacent track in response to a kick pulse applied thereto, said system comprising:

pause mode signal supplying means for supplying a pause signal when said reproducing apparatus is to be put into a pause mode, said reproducing apparatus generating said kick pulse in response to said pause mode signal being supplied thereto so that said reproducing element scans over the same track to carry out a pause operation;

timer means operating in response to the pause mode signal supplied from said pause mode signal supplying means for producing an output signal after a predetermined time period has elapsed; and mode control means supplied with the output signal of said timer means for cancelling the scanning of the same track by said reproducing element, said timer means operating while said pause mode signal is being applied thereto and producing an output signal every time a predetermined time period elapses, said mode control means advancing said reproducing element which is reproducing said same track turn by one track turn to carry out a frame advance operation every time the output signal of said timer means is applied thereto.

2. A system as claimed in claim 1 in which said mode control means cancels the scanning of said rotary recording medium by said reproducing element and returns said reproducing element to a resting position other than above said rotary recording medium, when supplied with the output signal of said timer means.

3. A system as claimed in claim 1 in which said timer means operates while said pause mode signal is applied thereto and produces an output signal every time a first predetermined time period elapses, and said mode control means comprises a frame advance mode control circuit for advancing said reproducing element which is reproducing said same track turn by one track turn to carry out a frame advance mode operation every time the output signal of said timer means is applied thereto, and an eject control circuit for cancelling the scanning of said rotary recording medium by said reproducing element and returning said reproducing element to a resting position other than above said rotary recording medium after a second predetermined time period greater than said first predetermined time period has elapsed.

4. A system as claimed in claim 3 which further comprises counter means for counting the output signal of said timer means and supplying an output signal to said eject control circuit to operate said eject control circuit when the counted value reaches a predetermined value.

* * * * *